Jan. 19, 1954   E. L. FEE   2,666,502
WHEEL CHOCK
Filed Dec. 27, 1948

INVENTOR
Earl L. Fee.
BY
Harness, Dickey & Pierce
ATTORNEYS.

Patented Jan. 19, 1954

2,666,502

UNITED STATES PATENT OFFICE 2,666,502

WHEEL CHOCK

Earl L. Fee, Windsor, Ontario, Canada

Application December 27, 1948, Serial No. 67,326

6 Claims. (Cl. 188—32)

This invention relates to wheel supports and, in particular, refers to portable wheel chocks.

It is an object of the invention to provide a pressure-actuated wheel chock which is adaptable to different wheel sizes and is readily applied to or removed from the wheel.

Another object is to provide a wheel chock which is mounted on rollers or vehicles so that it may be readily moved about.

A further object is to provide a wheel chock which may be disconnected from a wheel by a person quite remote therefrom, thus eliminating the hazard of propeller injuries when the chock is used for airplane wheels.

In the preferred form, these objects are accomplished by means of a construction which is very simple in design so that the chock can be inexpensively manufactured and yet is ruggedly durable and capable of withstanding shock loads or high stresses such as may be occasionally encountered in usage. To this end, an ordinary hydraulic jack may be employed as both the pressure means and as a strut or support member, and the actuating handle for the jack may be used to pull the chock about on its wheels. A lengthy release rope may be used to deenergize the pressure means and disconnect the chock.

A preferred form of the invention is shown by way of illustration in the accompanying drawings in which.

Figure 1:
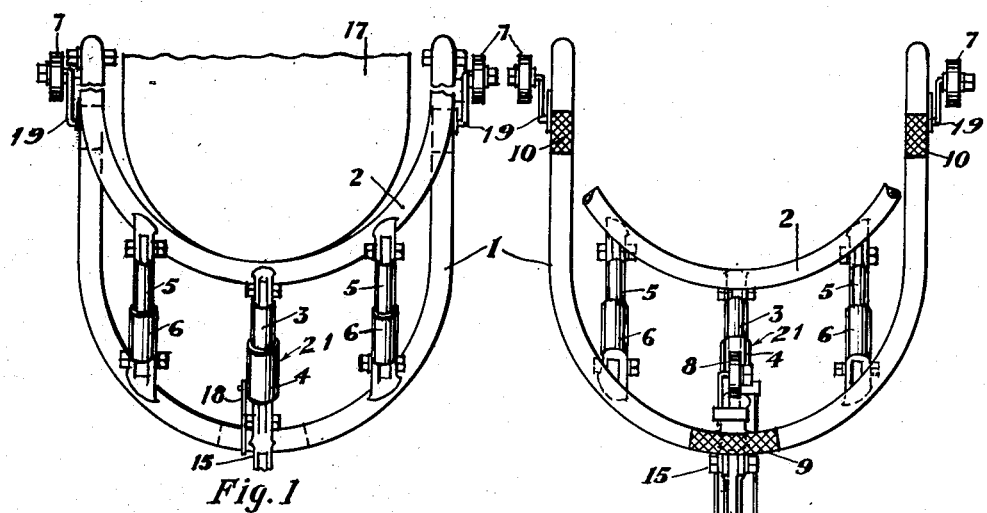
Figure 1 is a top plan view of the improved wheel chock.
Figure 2:
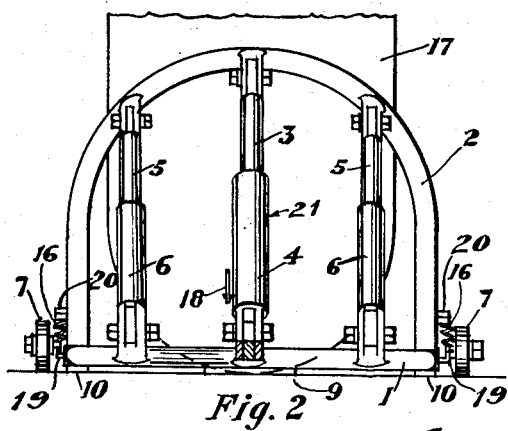
Fig. 2 is a front elevation partly in section of the wheel chock.
Figure 4:
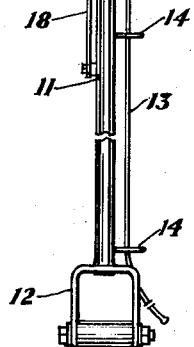
Fig. 4 is a bottom plan view of the improved wheel chock.
Figure 3:
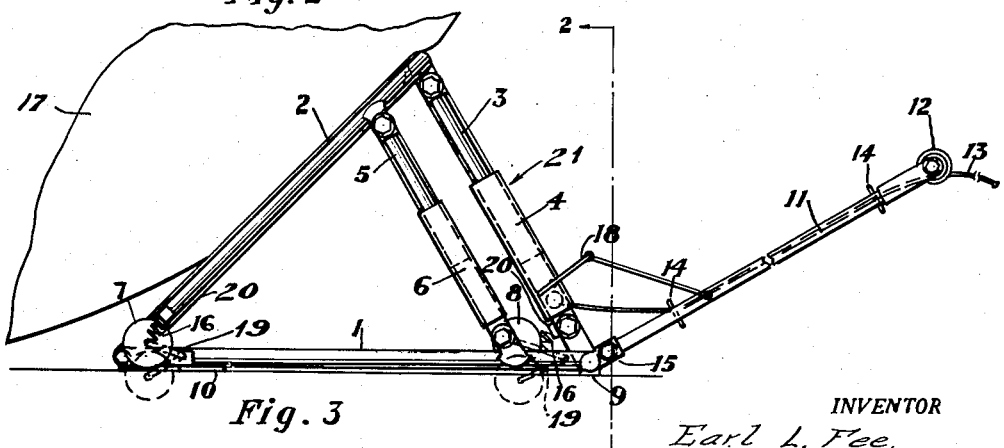
Fig. 3 is a side elevation of the wheel chock.

The improved wheel chock has a lower U-shaped frame 1 and an upper U-shaped frame 2 which members are pivotally connected at their open ends so that the frame 2 is normally disposed in angular or upwardly inclined relationship to the frame 1. The base sections of the frames 1 and 2 are interconnected by pressure-actuated means, such as a conventional hydraulic jack 21, which includes a piston 3 that may be pivoted to the frame 2 and a cylinder 4 for the piston that may be pivoted to the frame 1. The pressure-actuated means serves as a support and guide strut, but further guide means may be provided, if desired, such as the plungers 5 which are pivoted to the upper frame 2 on either side of the piston 3 and the tubes 6 for the plungers which are pivoted to the frame 1 on either side of the cylinder 4.

The chock is rendered mobile by means of wheels 7 which are attached to the open ends of the frame 1 and a wheel 8 which is attached to the base of the frame 1. These wheels are rotatably supported on crank arms 19 which are journaled in the frame 1 and yieldably biased downwardly by compression springs 16 which may abut against suitable blocks or connections 20 on the upper frame 2. Downward force on the frame 1 causes the wheels 7 and 8 to pivot upwardly on their crank arms 16 against the resistance of the springs 20 until the bottom of the frame 1 engages the roadway. To prevent movement of the frame 1 relative to the roadway when in engagement therewith, the base and legs of the frame may have roughened non-skid plates 9 and 10 affixed thereto which grip or dig into the surface of the roadway and resist slipping of the frame. When pressure or downward force on the frame 1 is released, the springs 20 force the frame 2 and thus frame 1 upwardly so that the latter is lifted from the roadway. The chock may then be easily moved on the wheels 7 and 8, and for this purpose is provided with a handle shank 11 that may be pivoted at 15 to the lower frame 1 and may have a hand grip 12 at its outer end. A release rope of any desired length may be operatively connected in a well-known manner to the release valve of the pressure means or hydraulic jack and passed through guide rings 14 secured to the side of the handle shank 11.

In operation, the chock with the frames 1 and 2 in collapsed condition is placed beneath the wheel 17. A suitable linkage 18 operatively connects the handle shank 11 to the hydraulic jack cylinder 6 so that the jack may be pumped up by reciprocating pivotal movement of the handle 11. The base of upper frame 2 therefore partially embeds itself in the resilient tire 17 and this tire overlap serves to securely connect the chock to the tire and to prevent overturning thereof. As pressure is applied in this manner, the wheels 7 and 8 collapse, of course, as already described. The rope 13 may be extended to a point remote from the wheel and when it is desired to remove the chock it may be pulled to release pressure in cylinder 6. This permits the frame 2 to lower under its own weight and the frame 1 rises so that if desired further tension on rope 13 may be used to roll the chock away from the wheel 17.

It will now be recognized that the construction described is light yet rugged and durable, the frames 1 and 2 being preferably formed of tubular metal. It may also be inexpensively manufactured from standard items and materials. From the operational standpoint, it makes it possible to apply a forceful, positive, chocking connection to the wheels in a simple manner, and yet this connection may be broken easily by an operator near or remote from the wheel. Furthermore, the chock may be readily moved about with little energy and thus more easily and accurately placed under the wheel in an optimum position of incipient engagement.

It will also be recognized that various changes may be made in the structure described without departing from the spirit of the invention.

What is claimed is:

1. In a wheel chock, the combination of a U-shaped lower frame, a U-shaped upper frame, pivotal connections between the open ends of the legs of said frames, expansible pressure-actuated means interconnecting the base portions of said U-shaped frames comprising a piston secured to one frame and a cylinder for the piston secured to the other frame, and slidable guide means interconnecting the frames comprising cylinders pivoted to one frame and pistons slidable in said cylinders pivoted to the other frame.

2. In a wheel chock, the combination of a U-shaped lower frame adapted to embrace a wheel, a U-shaped upper frame pivoted at its open ends to the open ends of the lower frame, pressure-actuated means for interconnecting the bases of said frames and for causing relative pivotal movement, wheels connected to the lower frame, means yieldably biasing said wheels downwardly and adapted to be overcome by downward force on the lower frame whereby said frame may engage the roadway, a handle pivoted to the lower frame to provide means for pulling the chock, and means operatively connecting the handle to the pressure-actuated means whereby pivotal movement of the handle energizes said pressure means.

3. In a wheel chock, the combination of a lower frame member, an inclined wheel-engaging member movably supported by the frame member, pressure-actuated means including a piston connected to one member and a cylinder to the other further movably supporting the inclined member on the lower member and also providing means for energizing relative movement between the members, and a release rope of substantial length operatively connected to the pressure-actuated means to provide means for deenergizing the same and collapsing the frame members.

4. In a wheel chock, the combination of a frame, wheels resiliently mounted on the frame to render said frame movable, a member movably secured to the frame and adapted to engage the wheel to be chocked, pressure-actuated means for moving the member into engagement with a wheel, common means for moving the frame and actuating the pressure means, and a release rope of substantial length operatively connected to the pressure-actuated means for releasing the pressure therein.

5. In a wheel chock, the combination of a U-shaped lower frame, a U-shaped upper frame, pivotal connections between the open ends of the legs of said frames, an hydraulic jack interconnecting the base portions of the frames to provide means for actuating relative pivotal movement, and a release rope of substantial length operatively connected to the hydraulic jack for releasing the pressure thereon.

6. In a wheel chock, the combination of a U-shaped lower frame, a U-shaped upper frame, pivotal connections between the open ends of the legs of said frames, a hydraulic jack interconnecting the bight portions of the frames to provide means for actuating relative pivotal movement, quick release means for said jack, and casters supporting said lower frame.

EARL L. FEE.

References Cited in the file of this patent

UNITED STATES PATENTS

| Number | Name | Date |
|---|---|---|
| 1,276,430 | Smith | Aug. 20, 1918 |
| 1,873,347 | Smart | Aug. 23, 1932 |
| 2,060,526 | Peterson | Nov. 10, 1936 |
| 2,176,551 | Solem | Oct. 17, 1939 |
| 2,316,178 | Morgensen, Jr. | Apr. 13, 1943 |
| 2,429,723 | Kelley | Oct. 28, 1947 |

FOREIGN PATENTS

| Number | Country | Date |
|---|---|---|
| 210,193 | Germany | May 25, 1909 |
| 524,864 | France | Sept. 12, 1921 |
| 361,805 | Italy | Aug. 4, 1938 |